United States Patent
Ikushima et al.

(10) Patent No.: US 6,588,236 B2
(45) Date of Patent: Jul. 8, 2003

(54) METHOD OF PROCESSING A SILICA GLASS FIBER BY IRRADIATING WITH UV LIGHT AND ANNEALING

(75) Inventors: Akira Ikushima, Nagoya (JP); Kazuya Saito, Nagoya (JP); Takashi Miura, Aichi-ken (JP); Shogo Nasuda, Inazawa (JP)

(73) Assignee: Kitagawa Industries Co., Ltd., Nagoya (JP)

( * ) Notice: Subject to any disclaimer, the term of this patent is extended or adjusted under 35 U.S.C. 154(b) by 19 days.

(21) Appl. No.: 09/842,939

(22) Filed: Apr. 26, 2001

(65) Prior Publication Data

US 2001/0042387 A1 Nov. 22, 2001

Related U.S. Application Data

(63) Continuation-in-part of application No. 09/351,951, filed on Jul. 12, 1999, now abandoned.

(30) Foreign Application Priority Data

Apr. 28, 2000 (JP) .......................................... 2000-130122

(51) Int. Cl.$^7$ ............................. C03B 25/02; C03B 37/15
(52) U.S. Cl. ............................. 65/378; 65/431; 65/425; 65/384; 65/385
(58) Field of Search ........................... 65/431, 425, 378, 65/384, 385

(56) References Cited

U.S. PATENT DOCUMENTS

| 4,028,080 A | 6/1977 | Di Vita |
| 4,157,253 A | 6/1979 | Hernquist |
| 4,182,664 A | 1/1980 | Maklad |
| 4,560,286 A | * 12/1985 | Wickersheim ........... 250/461.1 |
| 5,022,734 A | * 6/1991 | Kashyap ................... 119/459 |
| 5,130,981 A | * 7/1992 | Murphy ....................... 370/401 |
| 5,212,762 A | * 5/1993 | Shimada et al. ............ 385/141 |
| 5,267,343 A | 11/1993 | Lyons |
| 5,478,371 A | 12/1995 | Lemaire et al. |
| 5,559,907 A | * 9/1996 | Inniss et al. ................... 385/11 |

(List continued on next page.)

FOREIGN PATENT DOCUMENTS

| DE | 2808457 | 8/1979 |
| EP | 0 687 924 A1 | 12/1995 |

(List continued on next page.)

OTHER PUBLICATIONS

"Thermal Annealing of Defects Induced by Arf Excimer Laser Irradiation in a SiO$_2$"; Japanese Society of Applied Physics, Catalog No. AP 90110–02 (English Translation).

(List continued on next page.)

Primary Examiner—John Hoffmann
(74) Attorney, Agent, or Firm—Davis & Bujold, P.L.L.C.

(57) ABSTRACT

A processing method of a silica glass fiber, which is applicable to a long fiber, to improve its UV resistance by UV irradiation and heat treatment. Initially, a heating furnace 1 is positioned such that the left end of the silica glass fiber is within the heating furnace 1. Then, the heating furnace 1 is moved toward the right, while UV is irradiated with a UV source to the left end surface of the silica glass fiber. Since the silica glass becomes transparent due to removal of structural defects that have been caused by the UV irradiation, the UV travels further forward and causes other structural defects there. When the heating furnace 1 is moved there, the structural defects are removed and the silica glass fiber becomes transparent. By repeating these steps, the fiber is processed throughout length. Thus, mass production becomes possible and an improvement of productivity and lower costs can be achieved.

11 Claims, 1 Drawing Sheet

U.S. PATENT DOCUMENTS

| | | | |
|---|---|---|---|
| 5,620,496 A | | 4/1997 | Erdogan |
| 5,621,843 A | * | 4/1997 | Neuberger ................. 385/123 |
| 5,901,264 A | * | 5/1999 | Camlibel et al. ........... 385/128 |
| 5,983,673 A | | 11/1999 | Urano |
| 6,058,739 A | | 5/2000 | Morton |
| 6,113,285 A | * | 9/2000 | Ward ........................... 385/38 |
| 2001/0035029 A1 | * | 11/2001 | Ikushima et al. ............. 65/425 |
| 2001/0054300 A1 | * | 12/2001 | Fujiwara et al. ............. 65/33.2 |
| 2002/0046579 A1 | * | 4/2002 | Peterson et al. .............. 65/386 |
| 2002/0121115 A1 | * | 9/2002 | Carpenter et al. ............ 65/425 |

FOREIGN PATENT DOCUMENTS

| | | | |
|---|---|---|---|
| JP | 54-134721 | 10/1979 | |
| JP | 57-188423 | 11/1982 | |
| JP | 57-191247 | 11/1982 | |
| JP | 60-200204 | 10/1985 | |
| JP | 61-45201 | 3/1986 | |
| JP | 4-342427 | 11/1992 | |
| JP | 4-342436 | 11/1992 | |
| JP | 05-288942 | 11/1993 | |
| JP | 52-94657 | 11/1993 | ................. 65/425 |
| JP | 6-199539 | 6/1994 | |
| JP | 09-230048 | 9/1997 | |
| JP | 01-316445 | 12/1998 | |
| JP | 11-029335 | 2/1999 | |

OTHER PUBLICATIONS

Rothschiled, Mordechai, Daniel J. Ehrlich and David C. Shaver, "Eximer Laser Induced Damage in Fused Silica", *Microelectronic Engineering* 11, 1990, pp. 167–172.

"Temperature Dependence of the $E^1$ Center Creation in Silica Glasses", Physica Status Solidi (b), vol. 147, No. 1, 1988, pp. k1–k4.

* cited by examiner

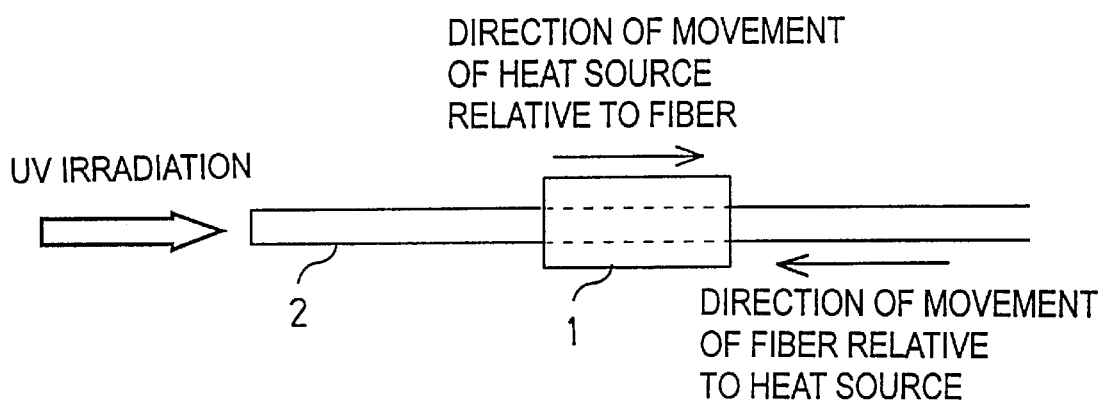

METHOD OF PROCESSING A SILICA GLASS FIBER BY IRRADIATING WITH UV LIGHT AND ANNEALING

This is a continuation-in-part application of patent application Ser. No. 09/351,951 filed Jul. 12, 1999 abandoned.

BACKGROUND OF THE INVENTION

1. Field of the Invention

The present invention relates to a method of processing a silica glass fiber.

2. Description of the Related Art

Silica glass fibers have been utilized for transmitting ultraviolet rays (hereinafter referred to as UV) (especially excimer laser beam), for example, in a photomask for excimer laser lithography, in a light guide for transmitting UV used to irradiate UV-hardening resin, and in the fields of microfabrication, medical treatment and the like.

When a silica glass fiber is used for transmitting UV, for example, to irradiate a UV-hardening resin, transmission of UV with a shorter wavelength and higher power is required, so that the hardening time of the resin can be reduced. The short wavelength and high power of the UV must therefor be fully available.

However, when UV is transmitted through silica glass, structural defects in the silica glass, decrease the transmittance. The decrease of transmittance of silica glass becomes greater, as the wavelength of UV becomes shorter and its light power becomes higher. Therefore, when an excimer laser is used as a light source, the transmittance of silica glass becomes worse especially with KrF excimer laser (wavelength: 248 nm) to $F_2$ excimer laser (wavelength: 157 nm) including ArF excimer laser (wavelength: 193 nm). The transmittance becomes worse when a laser of higher light power (one of various excimer lasers like KrF, ArF and $F_2$) is used as opposed to when a lamp of lower light power (a halogen lamp, a deuterium discharge lamp and the like) is used as a light source.

In order to reduce the decrease of transmittance of silica glass due to UV irradiation, or to improve resistance of silica glass to UV, a technique of increasing the hydroxyl group content of silica glass has been proposed in the publication of Japanese Unexamined Patent Application Hei 4-342427, publication of Japanese Unexamined Patent Application Hei 4-342436, etc. However, when the hydroxyl group content is increased, the wavelength of UV absorption edge becomes longer, with a result that UV of short wavelength (especially, vacuum ultraviolet zone) cannot be transmitted.

The solution to this problem was provided by a method (disclosed in co-pending U.S. patent application Ser. No. 09/351,951) in which multiple structural defects are purposefully caused in silica glass by irradiating silica glass with UV, and in which the structural defects are removed by performing heat treatment simultaneously with or after the UV irradiation.

In applying the method disclosed in the co-pending U.S. patent application Ser. No. 09/351,951 to a silica glass fiber, there occurred the following problems.

When UV with high power is repeatedly irradiated through the end surface of a fiber to cause structural defects, deterioration occurs only at the irradiated end, and UV does not reach the other end. Therefore, only a short fiber can be processed and it is impossible to process a long fiber throughout length. Also cutting a long fiber into a plurality of short fibers (about 1 m, for example) and processing these fibers one by one leads to an increase of costs.

On the contrary, if a relatively long fiber is irradiated with a lower power, it can be processed, but that requires a substantially long processing time and thus is unsuitable for mass production

SUMMARY OF THE INVENTION

It is an object of the invention to provide a method of changing the properties of silica glass fiber (an improvement in resistance) to UV caused defects by UV irradiation and heat treatment, which is applicable to a long fiber and suitable for mass production, and in consequence achieves improved productivity and reduced cost.

To attain this and other objects, in the first aspect of the present invention, there is proposed a method of processing a silica glass fiber, in which multiple structural defects are purposefully caused in a silica glass fiber by irradiating the silica glass fiber with UV, and the structural defects are removed by performing heat treatment in order to improve the UV resistance of the silica glass fiber, the method comprising the steps of irradiating the UV through one end surface of the silica glass fiber and shifting the heating zone from the one end surface through which the UV is irradiated toward the other end surface.

In the second aspect of the present invention, there is proposed the method of processing a silica glass fiber in the first aspect of the present invention, in which a heat resistant coating is applied to the silica glass fiber.

In the third aspect of the present invention, there is proposed the method of processing a silica glass fiber in the second aspect of the present invention, in which the heat resistant coating is a metal coating.

BRIEF DESCRIPTION OF THE DRAWING

The invention will now be described, by way of example, with reference to the accompanying drawing, in which the single Figure is an illustrative view of a processing device according to an embodiment of the present invention.

DETAILED DESCRIPTION OF THE PREFERRED EMBODIMENT

According to the method of processing silica glass fiber in the present invention, firstly, UV is irradiated through one end surface of a silica glass fiber, and multiple structural defects are caused in the silica glass at the irradiated end. By heating the end, the structural defects are removed, and the average bond angle of Si—O—Si network in the silica glass is increased compared with that before the heat treatment. As a result, structural relaxation proceeds to give structurally stable glass, and defects due to further UV irradiation are prevented from being formed.

When the structurally stable silica glass is obtained as described above by UV irradiation and heat treatment, its transmittance becomes good. As a result, the UV irradiated through the end surface passes through the portion, which has been treated as described above, travels further forward and causes structural defects in the further forward portion. When this portion is heated by the shift of a heating zone, the average bond angle of Si—O—Si network is increased compared with that before the heat treatment, the same as described above As a result, structural relaxation proceeds to give structurally stable glass, and defects due to UV irradiation are prevented from being formed. Then, the transmittance becomes good and the UV travels still further forward and causes structural defects in the still further forward portion. By the shift of the heating zone, the still further forward portion is heated to give structurally stable glass, and defects due to UV irradiation are prevented from being formed while the transmittance becomes good.

By continuing this process, the silica glass fiber is treated from the end irradiated with UV toward the other end little by little. Ultimately, production of structural defects by UV and stabilization by heat treatment are carried out throughout the length of the silica glass fiber and improved UV resistance compared with that of the original silica glass fiber is achieved Once an improvement in UV resistance of the silica glass is thus achieved, the transmittance of the silica glass also can be prevented from being deteriorated by irradiation of radioactive rays, that is, radiation resistance can be improved.

In the process according to the present invention, since the UV resistance and radiation resistance are improved not by increasing hydroxyl group content in silica glass, the wavelength of the UV absorbing end does not become longer.

With respect to UV irradiation and heat treatment to a silica glass fiber, the following conditions and features are to be noted.

The wavelength of the UV to be irradiated is appropriately within 50 nm–300 nm, preferably within 130 nm–250 nm, and further preferably within 150 nm–200 nm. When the wavelength is beyond these ranges, the UV resistance and radiation resistance improving effects tend to decrease, and when the wavelength is below the range, the UV resistance and radiation resistance improving effects tend to reach the limit.

The intensity of the UV to be irradiated is appropriately within 0.01 mJ/cm$^2$–1000 mJ/cm$^3$, preferably within 1 mJ/cm$^2$–500 mJ/cm$^2$, and further preferably within 1 mJ/cm$^2$–30 mJ/cm$^2$. When the intensity is beyond the range, the deterioration of silica glass tends to increase, and when the intensity is below the range, the UV resistance and radiation resistance improving effects tend to decreases.

As a UV source, which is not limited specifically, an ArF excimer laser, a KrF excimer laser, an excimer lamp, a deuterium lamp, and the like can be employed, for example.

UV irradiation must be continued long enough for structural defects to be caused partially (this can be confirmed by a decrease of the UV transmittance). In other words, it is necessary to continue UV irradiation until the decrease of the UV transmittance reaches its limit.

In the present invention, however, since the heating zone for heat treatment is shifted, the speed of the shift must be taken into account. The shift may be carried out in a continuous way at a predetermined speed or in an intermittent way such that the heating zone is shifted by a predetermined distance and stopped repeatedly.

Therefore, it is preferable to previously determine, based of an experiment, an appropriate irradiation and other conditions such as the speed and the temperature of the heating zone considering the UV intensity, the material and the size of the silica glass fiber, etc., then perform UV irradiation and heat treatment in accordance with these conditions.

Heating for heat treatment is preferably by a non-contact heating method using an electric furnace, infrared irradiation, etc. The shift of the heating zone may be either by moving the heat source (for example, an electric furnace, an infrared lamp, or an infrared laser) by moving the fiber or both Whereby, the heat source and the fiber are moved. The essential thing is that the heating zone is shifted from one end (the end through which irradiation is performed) of the fiber to the other end.

The temperature of the heat treatment is appropriately from 100° C. to 1600° C., preferably from 200° C. to 1400° C., and further preferably from 300° C. to 1300° C. When the temperature is outside these ranges, the UV resistance and radiation resistance improving effects tend to decrease.

The variation of bond angle of Si—O—Si network can be confirmed by analyzing the peak point of infrared absorption around 2260 cm$^{-1}$ in the infrared absorption measurement. Specifically, as the structural relaxation of the silica glass proceeds (i.e. as the UV resistance increases), the peak point of infrared absorption around 2260 cm$^{-1}$ in the infrared absorption measurement Is shifted to a higher frequency (shorter wavelength) within the range from about 2255 cm$^{-1}$ to about 2275 cm$^{-1}$.

A known silica glass fiber has a three-layer structure which consists of a core, a clad, and a coating in order from its center. The clad is made of fluorine-added silica glass, and the core is made of genuine silica glass, OH-group-added silica glass, or silica glass to which fluorine of a density lower than that in the clad is added. The present invention can be applied to silica glass of other kinds as well as a known silica glass fiber such as the above.

Furthermore, there is not any particular limitation to the material of the coating, although it is preferable to employ a heat resistant coating because the coating is exposed to a relatively high temperature. Among various heat resistant coatings, a metal coating, which has a good heat conductivity, can lead to efficient heat treatment. Also, since any metal coating is a good absorber of near infrared radiation, near infrared radiation should be used for heat treatment when a metal coating is employed.

An Example of a Processing System

The single figure shows an example of a processing system.

In the processing system, a heating furnace 1 (an electric furnace) corresponding to the heating zone is moved from the shown left to the right in the figure by a not shown moving mechanism. Initially, the heating furnace 1 is located such that the shown left end of the silica glass fiber 2 is placed within the heating furnace 1. Then, the heating furnace 1 is moved to the right, while UV irradiation is performed to the left end of the silica glass fiber 2 by a not shown UV source. Other heat sources such as a near infrared lamp may be used instead of the heating furnace 1.

Although only a single silica glass fiber 2 is shown in the present figure, multiple or bundled silica glass fibers, for example, can simultaneously be processed. In this case, by designing a UV source to irradiate the multiple silica glass fibers in a circulating manner, the processing system can be downsized.

As described above, according to the processing method of the present invention, the target part of a silica glass fiber 2 for processing so as to improve its UV resistance is shifted from one end of the fiber to the other end, and thus a change of the properties (an improvement in its UV resistance) by UV irradiation and heat treatment can be applied to a long fiber. Therefore, mass production becomes possible, and an improvement in productivity and lower costs can be achieved.

For working of the present invention, a silica glass fiber having a heat resistant coating is suitable, and among various heat resistant coatings, a metal coating, which has a good heat conductivity, leads to efficient heat treatment. Also, since any metal coating is a good absorber of near infrared radiation, infrared radiation should be used for heat treatment when a metal coating is employed.

It is to be understood that the present invention is not limited to the aforementioned embodiment but can be embodied in various ways without departing from the scope of the invention.

What is claimed is:

1. A method of processing a silica glass fiber to reduce the UV resistance thereof, the method comprising the steps of:
   purposefully causing multiple structural defects in at least a first portion of the silica glass fiber by irradiating UV light through one end of said silica glass fiber;
   providing a heat source producing a heating zone;
   removing the multiple structural defects in the first portion by applying the heating zone to the first portion of the silica glass fiber; and
   shifting the heating zone to an adjacent second portion of the silica glass fiber by moving the heat source relative to the silica glass fiber from said one end of said silica glass fiber, through which the UV is irradiated, toward another end thereof.

2. The method of processing a silica glass fiber according to claim 1, wherein said silica glass fiber is provided with a heat resistant coating therearound resistant to melting during heating.

3. The method of processing a silica glass fiber according to claim 2, wherein said heat resistant coating is a metal cladding.

4. A method of processing a silica glass fiber to decrease resistance to transmission of ultraviolet radiation through the fiber comprising the steps of:
   a) irradiating an end portion of the fiber through one end thereof to cause multiple structural defects adjacent said end of the fiber;
   b) heating said end portion of the fiber to remove the structural defects to decrease resistance to transmission of ultraviolet radiation through said irradiated portion of the fiber;
   c) subsequent to irradiating the end portion of the fiber, irradiating an intermediate portion of the fiber through the end portion from said end to cause multiple structural defects in said intermediate portion;
   d) subsequent to heating the end portion of the fiber, heating said intermediate portion to remove structural defects therein and decrease resistance to transmission of ultraviolet radiation therethrough; and
   e) successively irradiating and heating a next adjacent portion of the fiber, throughout a desired length of the fiber, to decrease resistance to transmission of ultraviolet radiation throughout the length of the fiber.

5. The method of claim 4 comprising the step of continuously irradiating said fiber from said end with ultraviolet radiation.

6. The method of claim 5 comprising the step of completing a heating step for one portion of the fiber before heating the next adjacent portion of the fiber to remove the structural defects caused by irradiation from the fiber one portion at a time.

7. The method of claim 6 further comprising the step providing a heat source for heating only a portion of the length of fiber, and moving the heat source relative to said length of fiber at a rate to successively heat adjacent portions of the fiber to remove multiple structural defects along the length of the fiber produced by said irradiation.

8. The method of claim 7 further comprising the step of providing the heat source separate from the length of fiber to facilitate moving the heat source along said length of fiber at a rate to successively heat adjacent portions of the fiber to remove multiple structural defects along the length of the fiber produced by said irradiation.

9. A method of processing a silica glass fiber to reduce the UV resistance thereof comprising the steps of:
   purposefully causing a plurality of structural defects in the silica glass fiber by irradiating said silica glass fiber with UV; and
   removing said structural defects and increasing an average angle of a Si—O—Si network in the silica fiber by heating the silica fiber, comprising the steps of:
   irradiating the UV through one end of said silica glass fiber; and
   shifting a heating zone from said one end of said silica glass fiber, through which the UV is irradiated, toward the other end thereof.

10. The method of processing a silica glass fiber according to claim 9, further comprising the step of providing a heat resistant coating resistant to melting around said silica glass fiber.

11. The method of processing a silica glass fiber according to claim 9, further comprising the step of providing the silica glass fiber with a metal coating resistant to melting from the heat produced by the heating zone.

* * * * *